United States Patent [19]
Langley

[11] Patent Number: 5,409,761
[45] Date of Patent: Apr. 25, 1995

[54] BREATHABLE NON-WOVEN COMPOSITE BARRIER FABRIC AND FABRICATION PROCESS

[75] Inventor: John D. Langley, Guntersville, Ala.

[73] Assignee: Kappler Safety Group, Guntersville, Ala.

[21] Appl. No.: 87,003

[22] Filed: Jul. 2, 1993

Related U.S. Application Data

[63] Continuation-in-part of Ser. No. 673,742, Mar. 22, 1991.

[51] Int. Cl.$^6$ .............. A41D 13/12; A61B 19/08; B32B 5/32; B32B 7/04; B32B 31/20
[52] U.S. Cl. .............................. 428/198; 2/901; 128/849; 156/73.1; 422/34; 428/286; 428/315.5; 428/315.7; 428/315.9; 428/340
[58] Field of Search .............. 428/198, 286, 315.9, 428/315.5, 315.7, 340; 156/73.1; 128/849; 422/34; 2/DIG. 7

[56] References Cited

U.S. PATENT DOCUMENTS

| | | | |
|---|---|---|---|
| 4,041,203 | 8/1977 | Brock et al. | 428/157 |
| 4,374,888 | 2/1983 | Bornslaeger | 428/198 |
| 4,379,192 | 4/1983 | Wahlquist et al. | 428/156 |
| 4,433,026 | 2/1984 | Molde | 428/252 |
| 4,539,256 | 9/1985 | Shipman | 428/315.5 |
| 4,828,556 | 5/1989 | Braun et al. | 604/365 |
| 4,847,142 | 7/1989 | Twilley et al. | 428/252 |
| 4,867,881 | 9/1989 | Kinzer | 210/490 |
| 4,898,761 | 2/1990 | Dunaway et al. | 428/137 |
| 4,975,469 | 12/1990 | Jacoby et al. | 521/84.1 |
| 4,983,450 | 1/1991 | Yanagihara et al. | 428/283 |
| 5,043,209 | 8/1991 | Boisse et al. | 428/233 |
| 5,110,506 | 5/1992 | Ciallella | 252/559 |
| 5,114,787 | 5/1992 | Chaplin et al. | 428/284 |
| 5,169,712 | 12/1992 | Tapp | 428/315.5 |
| 5,187,005 | 2/1993 | Stahle et al. | 428/252 |
| 5,208,098 | 5/1993 | Stover | 428/284 |

FOREIGN PATENT DOCUMENTS 63-276533A 8/1987 Japan .

Primary Examiner—James C. Cannon
Attorney, Agent, or Firm—Henry Croskell

[57] ABSTRACT

A breathable non-woven composite fabric having barrier capabilities to biological liquids comprised of at least one non-woven layer bonded to at least one surface of a thermoplastic microporous film, the non-woven composite fabric providing a barrier to passage of biological liquid when the composite fabric is subjected to contact with synthetic blood under the dictates of testing procedure ASTM ES 21 92 while maintaining a moisture of vapor transmission rate of greater than about 450 grams per square meter for 24 hours at about 75° F. and about 65% relative humidity, the non-woven composite fabric having a breaking strength of at least about 14 pounds. A process is provided for forming the non-woven composite fabric which has been thermally bonded by unwinding and contacting at least one continuous thermoplastic non-woven web to at least one side of a continuous thermoplastic microporous film, continuously transporting said contacted webs and film through a thermal bonding zone and thermally bonding the webs and film at multiple spaced-apart locations, said bonding having a dwell time sufficient to thermally bond said composite while avoiding burn-through degradation of the film and webs.

37 Claims, 1 Drawing Sheet

BREATHABLE NON-WOVEN COMPOSITE BARRIER FABRIC AND FABRICATION PROCESS

This application is a continuation-in-part of U.S. patent application Ser. No. 673,742, filed Mar. 22, 1991.

Field of the Invention

This invention relates to breathable non-woven composite barrier fabrics which are impervious to water-based liquids such as body fluids but which allow passage of water vapor. Applications for such fabrics exist in the field of protective garments for medical technicians, laboratory workers, and the like where it is desired to prevent passage of blood or other body fluids to the body of the worker or from the worker to the patient while allowing passage of water vapor. Garments with such characteristics provide enhanced comfort for the wearer by allowing perspiration to escape, consistent with maintaining a barrier to passage of liquids.

This invention further relates to a breathable non-woven composite barrier fabric and fabrication process for the fabric wherein a non-woven web layer is thermally bonded to a microporous film of polyolefin materials either on one side only or on both sides of the microporous film. The breathable non-woven composite barrier fabric provides performance characteristics in terms of vapor transmission, body fluid blockage and necessary strength by selection of materials having specific physical properties for the respective layers and the microporous film which are thermally bonded into a composite fabric. Fabrics employing the invention are effective for use in protective garments where stoppage of body fluids such as blood, along with enhanced comfort and permeability to vapors produced by perspiration. The composite fabric may be fabricated from available materials inclusive of non-woven webs and microporous films that are readily fabricated utilizing continuous webs and microporous film which are continuously transported in contact through a thermal bonding zone achieving a composite fabric with multiple spaced-apart thermal bonds, said bonds being provided while avoiding bum-through degradation of the film and webs, thereby forming the thermally bonded non-woven composite fabric.

Microporous films have a structure that enable vapors to flow through the films while blocking liquids. The effective pore size is at least several times the mean free path of the flowing molecules, namely from several micrometers down to about 100 angstroms. Such films are generally opaque, even when made of a transparent material because the surfaces of the internal structure scatter visible light. The term "microporous film" as used herein is inclusive of microporous membranes.

Microporous films and combinations of said films with various layer materials have been utilized in a wide variety of applications. The microporous films have been used individually in applications for filtration of solids, as diffusion barriers or separators in electrochemical cells and in the preparation of synthetic leather, or cloth laminates. Use as cloth laminates require permeability of water vapor while substantially blocking liquid water for applications such as synthetic shoes, raincoats and outerwear and the like. Microporous films are also utilized for filter cleaning antibiotics, beer, oils, bacteriological broths, microbiological samples, intravenous fluids, vaccines and the like. These films have also been utilized to make surgical dressings, bandages and other fluid transmissive medical applications. Such microporous films generally need to be laminated in order to fabricate garment materials for purposes of strength. The microporous films or membranes without lamination by web materials generally do not have sufficient strength to produce suitable garment materials.

Thermally bonded composites of microporous films, i.e., the combination of microporous film and web materials are frequently applied to situations requiring vapor permeability while presenting some form of barrier to the passage of water and/or aqueous solutions or aqueous suspensions, however, none of these materials have been found to be effective in combining strength of fabric, barrier limits defined by ASTM standards for passage of body fluids and sufficient breathability for utilization in medical garment fabrication.

BACKGROUND OF THE INVENTION

Breathable multi-layer barrier fabrics of various combinations of layered material are disclosed in prior art patents. U.S. Pat. No. 4,041,203, issued Aug. 9, 1977, to Brock et al., discloses a fabric made up of a mat of generally discontinuous thermoplastic microfibers as a top layer and a web of substantially continuous, randomly deposited polymer filaments as a bottom layer, the layers being bonded at intermittent discrete regions. A three-layer fabric having a mat layer on the outside and a web layer in the middle is also disclosed. The specific polymer materials used for the mat and the web include polyolefins such as polypropylene. U.S. Pat. No. 4,828,556, issued May 9, 1989, to Braun et al., discloses a multi-layer fabric having a first layer of porous melt-blown material, a second layer comprised of a non-microporous film of polyvinyl alcohol, and a third layer of porous non-woven material in the form of a spun-bonded or melt-blown web. The fabric of this reference is said to be useful for absorbent articles such as diapers. Numerous prior patents directed to microporous films are also disclosed and discussed in this reference. Impervious, absorbent barrier fabrics are disclosed in U.S. Pat. No. 4,379,192, issued Apr. 5, 1983, to Wahlquist et al., the fabric including layers having continuous filament webs, microfiber mats, and polymeric film, the mats providing an uncompacted absorbent center layer.

In addition, various orientated microporous films are presented in U.S. Pat. No. 4,867,881, issued Sep. 19, 1989, to Kevin E. Kinzer, which discloses a microporous article comprising a thermoplastic polymeric structure having a plurality of cells with adjacent cells being interconnected by passageways to provide a network of communicating pores with the structure being orientated in at least one direction. Laminated structures of these same microporous materials are presented having at least one other material laminated to the microporous film are disclosed is U.S. Pat. No. 4.539,256, issued Sep. 3, 1985, to Gene H. Shipman. Porous film composites are disclosed in U.S. Pat. No. 5,169,712, issued Dec. 8, 1992, to William T. Tapp wherein porous film composites having at least one layer of an orientated polymeric porous film comprised of ethylene-propylene co-polymers and other specific polymer requirements are disclosed. While numerous combinations of layers of various polymeric materials prepared in a desired physical form are disclosed in these references in combination with microporous films, the combination of an inner layer of microporous film and outer layers of non-woven materials which are thermally bonded into a composite fabric having minimum strength, vapor permeability and body fluid barrier capabilities as disclosed herein are not known to have been disclosed or suggested by the prior art.

Other porous film composites are disclosed in the Japanese Patent Application, Kokai, No. 63-276533, publication date Nov. 14, 1988, inventors Kawano et al., entitled "Laminated Film". The Japanese reference "Laminated Film" does not provide a liquid barrier in fact presents a filtered-type product which readily flows liquid and would be suitable for example as a separator in an electrochemical cell. A breathable non-woven composite barrier fabric for protective garments should provide for wear comfort by enabling passage of water vapor resulting from perspiration or humidity in the environment, as well as forming a barrier to passage of body fluids such as blood. For effectiveness in situations involving handling of patients, the barrier should be effective at elevated pressure to prevent the blood from being projected or soaked through the fabric. In addition, strength and durability are a necessity in the fabric as exemplified by breaking strength as defined by ASTM D751 (Grab Method) and Mullen burst test values.

SUMMARY OF THE INVENTION

The present invention discloses a breathable non-woven composite barrier fabric and a fabrication process for preparing said fabric. The fabric has unique performance characteristics of minimum levels regarding vapor permeability, barrier to passage of biological fluids and sufficient fabric strength to meet day-to-day requirements of the fabrics when utilized in garments. The non-woven composite fabrics are constructed of a microporous thermoplastic film having at least one film surface thermally bonded to a layer of non-woven thermoplastic materials, the film and layers being thermally bonded at multiple spaced-apart locations. These non-woven composite fabrics provide a barrier to passage of biological fluid when the composite fabric is subjected to contact with synthetic blood at 0 psi for 5 minutes followed by synthetic blood contact at 2 psi for 1 minute followed by synthetic blood contact at 0 psi for 54 minutes, the composite fabric exhibiting no visible penetration of the synthetic blood. This non-woven composite fabric performance meets the requirements of ASTM designation ES 21-92 entitled "Emergency Standard Test Method for Resistance of Protective Clothing Materials to Synthetic Blood" which is hereby incorporated by reference. In addition to the barrier performance of the fabric, the fabric is capable of having a moisture or vapor transmission rate of greater than about 450 grams per square meter for 24 hours at a temperature of about 75° F. and a relative humidity of about 65%. These moisture or vapor transmission rates are determined by ASTM designation E96-80 entitled "Standard Test Methods for Water Vapor Transmission of Materials" and hereby incorporated by reference. The ASTM E96-80 test utilizes two testing methodologies, Upright Cup Method and Inverted Cup Method. In addition the fabrics according to the invention in order to be utilized as protective garments for example in the medical field must have a suitable strength such as a breaking strength of at least about 14 pounds.

It has been found that thermally bonded non-woven composite fabrics do not meet this physical performance criteria readily due to burn-through of the thermal bonding thus disruption of the physical characteristics which are required. The thermal bonding of the composite fabric at multiple spaced-apart locations can be achieved by ultrasonic point bonding and one or more layers or webs can be utilized in combination with one or more microporous films. A process for forming the thermally bonded non-woven composite fabrics is also presented wherein the fabrics have these physical performance characteristics. The process includes unwinding and contacting at least one continuous thermoplastic non-woven web to at least one side of a continuous thermoplastic microporous film, continuously transporting said contacted webs and film through a thermal bonding zone. The thermally bonding of the webs and film are at multiple spaced-apart locations. The thermal bonding is achieved under control dwell time which allows appropriate bonding for strength basis and yet avoids burn-through degradation of the composite webs and film.

It is, therefore, an object of this invention to provide a breathable non-woven composite barrier fabric comprised of thermoplastic materials which are fabricated through thermal bonding and have capabilities for providing permeation of water vapor while simultaneously providing a barrier against passage of water-based fluids such as body fluids.

Another object of the invention is to provide such a fabric that provides a barrier to the passage of blood under the dictates of ASTM designation ES21-92, the current designation for use in medical and related protective garments.

Yet another object is to provide a breathable non-woven composite barrier fabric that can be fabricated using multiple spaced-apart thermal bonding on readily available thermoplastic materials.

Other objects and advantages of the invention will be apparent from the following detailed description and the appended claims.

DESCRIPTION OF THE PREFERRED EMBODIMENT

Figure 1:
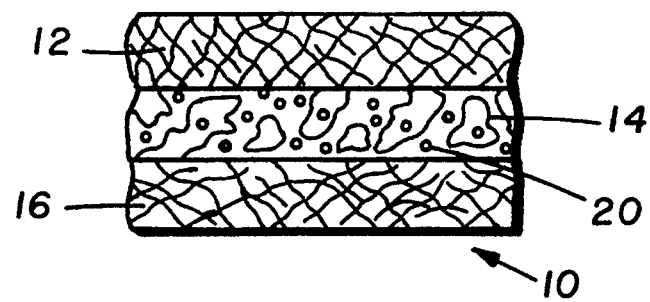
FIG. 1 is a diagrammatic representation of a cross-sectional view of a multi-layer composite fabric embodying the invention.
Figure 2:
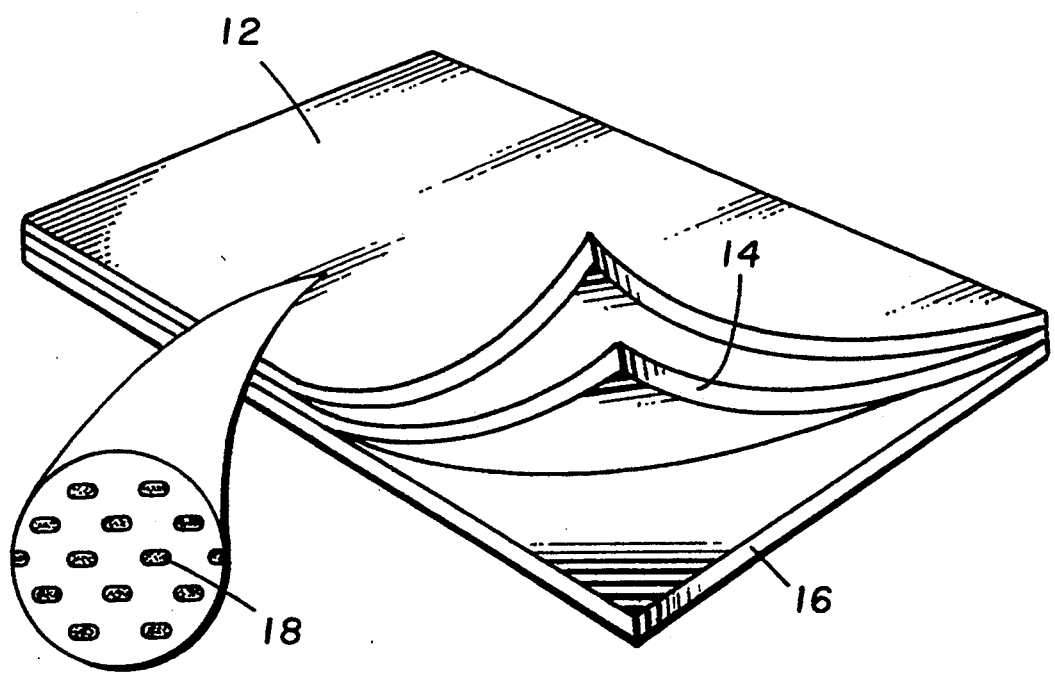
FIG. 2 is a schematic fragmentary perspective view, with portions peeled away, of the fabric of FIG. 1.

Referring to the drawings, there is shown a breathable non-woven composite barrier fabric 10 made up of three layers, a top layer 12 of a spun-bonded polyolefin, a middle layer 14 of a microporous thermoplastic film, and a bottom layer 16 of spun-bonded polyolefin. The three layers are secured to one another by thermal or ultrasonic bonding at spaced-apart points 18 throughout the fabric surface.

Top layer 12 may be comprised of a non-woven polyolefin with the microporous thermoplastic film middle layer 14 preferably being comprised of polypropylene or any other thermoplastic materials which will accept point thermal bonding or ultrasonic bonding and maintain the minimum performance levels as defined. As performance levels are achieved by strengthening the composite fabric by thermal point bonding as well as avoiding burn-through of the microporous film and webs and also avoiding melt flow closure of the porosity of the microporous film.

The non-woven thermoplastic layer of web materials have a weight of from about 0.2 to about 2.5 ounces per square yard with about 0.5 to about 1.0 being preferred. The non-woven layers are preferably spun-bonded providing strength to the composite fabric along with a cloth-like surface texture which enhances the use of the fabric for garments, as contrasted to film materials which have a smooth plastic surface. Spun-bonded polypropylene or polyethylene or co-polymers of polyolefins are suitable for use in the fabrication of the breathable non-woven composite barrier fabric and are available from various sources. Spun-bonded polyolefin suitable for this purpose is available from Poly-Bond, Inc. under the designation "Poly-Bond". Properties of such spun-bonded webs useful in accordance with the fabrication of the present fabric are achieved with a wide range of web weights, however suitable thermally bonded composites result from the lower weight webs as well as the higher weight webs. The non-woven webs have a grab strength in machine direction of at least 6.5 pounds to break, cross-directional of at least 5 pounds to break and an elongation value of at least 52% machine direction and at least 72% cross-direction.

The bottom layer 16 may have the same composition as top layer 12, although top layer 12 and bottom layer 16 may be comprised of different materials and have different web weights and be suitable for utilization in the thermally bonded non-woven composite barrier fabric. The middle layer 14 is comprised of a microporous film of a thermoplastic material which maintains its porosity without burn-through when thermally bonded in fabrication of the composite with the thermoplastic webs or layers. Preferably the microporous film is comprised of polypropylene which is amenable to point thermal bonding, specifically ultrasonic point thermal bonding, without experiencing burn-through in controlled conditions. The polypropylene films have a microporous structure with extremely small random pores 20 extending through the film matrix, allowing vapor such as water vapor to pass through, while forming a barrier to passage of liquids such as body fluids. A suitable film material is available from 3M Disposable Products Division under the designation, "Scotch Ⓡ microporous film." Properties of a designated film suitable for use in this invention are as follows: thickness, 1.5 mil; weight, 0.85 ounce per square yard; tensile strength at break (DPD Test Method 106), machine direction, 2,000g/25 mm; cross direction, 950 grams/25 mm; elongation at break (DPD Test Method 106), machine direction, greater than 100 percent, cross direction, greater than 100 percent. Permeation/barrier properties include a moisture vapor transmission rate of greater than 5,000 grams per square meter per 24 hours at 75° F. and 50% relative humidity as measured by the inverted cup method; air permeability, less than 400 seconds/50 cc by Gurley Densometer Ⓡ measurement and water hold-out, greater than 45 pounds per square inch as measured by Mullen burst test. Other microporous films having a moisture vapor transmission rate of greater than 1,500 g/m²/24 hr. at 86° F. and 48 percent relative humidity as measured by ASTM E96 and water holdout greater than 50 psi are acceptable.

Thermoplastic polymers useful in the present invention include olefinic, condensation and oxidation polymers. Representative olefinic polymers include high and low basis weight polyethylene, polypropylene, polyvinyl containing polymers, butadiene containing polymers and the like. Condensation polymers include polyesters such as polyethylene terephthalate and polybutylene terephthalate, polyamides such as nylon 6, nylon 13 and nylon 66, polycarbonates and polysulfones. Polyphenylene oxide is representative of the oxidation polymers which can be used. Blends of thermoplastic polymers may also be used. However, while most of these thermoplastic polymers can be utilized in forming a suitable web for combining with microporous film, the microporous film must be comprised of polymeric materials, i.e. thermoplastics, which can survive thermal bonding, ultrasonic point bonding and the like without degenerating due to burn-through thus losing the barrier properties and yet maintaining moisture vapor permeability, i.e. through point bonding versus hot roll thermal bonding.

As used herein, the term "thermoplastic polymer" refers only to conventional polymers, both crystalline and non-crystalline, which are melt processible under ordinary melt processing conditions and does not include polymers such as polytetrafluoroethylene which under extreme conditions, may be thermoplastic and melt processible. Suitable microporous films utilized in accordance with the present invention may be provided by the processes as defined in U.S. Pat. No. 4,867,881, issued Sep. 19, 1989, entitled "Orientated Microporous Film" which is hereby incorporated by reference.

Major limitations of prior porous film composites comprising layers, of microporous film and a second material include the ability to form a porous film composite which retains the vapor permeability of the porous film while at the same time not contributing greatly to the stiffness or bulk of the composite from the addition of the other material and avoidance of burn-through conditions and thermal bonding or blockage of the porosity of the porous film component either through adhesive or hot roll thermal bonding.

For example, porous film composites wherein webs are used to impart strength, especially in the cross-machine direction, the spun-bonded webs are typically non-uniform in basis weight and coverage such that the relatively thicker and thinner areas are easily recognized by the human eye. Attempts have been made to compensate for these poor fabric properties and limiting physical properties resulting from the non-conformity of basis weight and coverage by using spun bond webs having a heavier base weight than what would normally be required by the particular application. This problem also leads to burn-through of point thermal bonding materials, fabrication of composites with greater stiffness, increase bulk and other undesired features.

Thermal bonding technologies, in particular ultrasonic bondings are established tools in the industry utilizing thermoplastic materials. Use of ultrasonic energy in fabric and fiber bonding is well known and is best known in the textile industry for ultrasonically formed mattress pads and bed sheets via the pinsonic or pin point ultrasonic processing. The point bonding ultrasonic process has provided the foundation for using ultrasonic energy to laminate and/or form non-woven fabrics and products. The process has been successful because of the inherent advantages that generally apply to all welding of thermoplastic by ultrasound, including speed, efficiency, good bond integrity and elimination major melt zones.

Ultrasonic bonding presents only three process variables which are amplitude, pressure and time. Since the desired result is ultimately energy to melt and bond fibers, it can be simply stated that power is a function of ultrasonic horn vibration amplitude and pressure and that energy is a function of power used and time. These process variables are roughly established by prior experience and can be adjusted to meet the needs of the specific application which has desired melt depth, thickness of traveling webs and composites and adjustability of the ultrasonic horns in relationship to the traveling webs which are being thermally, i.e. ultrasonic point bonded. The dimensional relationship with a pattern roll which is in a fixed position having multiple pins mounted thereon defines in cooperation with the horn surfaces a gap for travel of the contacted webs and microporous films. Other variables that become fixed are web area, fiber type and amount of fiber. Within certain limits, the ultrasonic variables can be changed in relationship to one another in order to acquire a constant result. However, changes in nonultrasonic variables such as fiber type, blend or weight will require one or more new changes in the ultrasonic variabilities to ensure adequate energy to the bonded area.

A major difference in ultrasonic bonding and thermal bonding is that heat energy is not conducted through the fiber to be bonded but instead generated within the fiber itself, minimizing degradation of material through excessive heat. In addition, ultrasonic processing is faster with reported speeds in excess of 100 feet per minute. In general, the pattern roll with multiple pin extensions for grading pressure proximity of the ultrasonic horn surfaces are air cooled in order to avoid undue thermal buildup which would be detrimental to, for example, the microporous characteristics of the microporous film.

The ultrasonic bonding process in accordance to the invention for fabricating breathable non-woven composite barrier fabric utilizes a pattern roll which is in an affixed position having pins extending therefrom with approximate diameters of about 0.5 mm. However the ultrasonic bonding apparatus can be improved by modifying dwell time through use of elongated pins of about the same cross-section, i.e. 0.5 mm. As the contacted webs and microporous film travel rate through the ultrasonic processing zone at 26 yards per minute, a contact time of the pin with the contacted webs and film is determined to be about 1.3 milli-seconds. Reduction of speed of travel of the contacted webs and microporous film will provide stronger bonding for lighter non-woven areas or lighter non-woven webs. In any case, the dwell time of the traveling contacted webs and microporous film through the ultrasonic bonding zone must be carefully controlled in order to avoid burnthrough degeneration of the film and webs and the apparatus must have adjustability of the gap in order to accommodate the various thicknesses of materials presented in the contacted webs and films.

The breathable non-woven composite barrier fabric according to the invention can be utilized in cooperation with various additives such for example as antistatic compounds. Since many antistatic compound additives perform as wetting agents, generally the antistatic compounds are added to the web surface which will be next to the user, thus avoiding any wetting of the environmental surface which will be exposed to body fluids and the like. By adding the antistatic materials to the user side of the fabric, the performance criteria of the fabric is not compromised; however, selected known antistatic compounds having lesser wetting characteristics can be added to both sides of the fabric as long as the minimum fabric performance criteria is maintained. In addition the fabrics according to the invention can be sterilized for use in sterile environment requirements such as medical and certain laboratory and manufacturing operations. Depending on the thermoplastic polymers comprising the fabric, this sterilization can be achieved through, for example, radiation and chemical sterilization such as through the use of ethylene oxide. Ethylene oxide is preferable when utilizing polypropylene thermoplastic polymers, however, other suitable sterilization compounds and techniques can be utilized if such sterilization procedures do not compromise the minimum performance levels of the fabric.

The invention is further illustrated by the following examples, comparative examples and test procedure methods.

Emergency Standard Test Method for Resistance of Protective Clothing Materials to Synthetic Blood (ASTM ES21-92)

Workers, primarily those in the health care profession, involved in treating and caring for individuals injured or sick, can be exposed to biological liquids, capable of transmitting disease. The diseases, which may be caused by a variety of microorganisms, can pose significant risks to life and health. This is especially true of bloodborne Hepatitis B, Hepatitis C, and Human Immunodeficiency Viruses, which are related to Hepatitis and AIDS. Since engineering controls cannot eliminate all possible exposures, attention is placed on reducing the potential or direct skin contact through the use of protective clothing that resists penetration. Chemical molecular diffusion is not recognized as a transmission mode for microorganisms. This test method determines resistance to penetration of blood and other body fluids using synthetic blood.

Scope

This test method covers the determination of the resistance of protective clothing materials to penetration by biological liquids using synthetic blood under the condition of continuous liquid contact. Protective clothing material "pass/fail" determinations are based on visual detection of synthetic blood penetration.

This test method has been designed to measure the effectiveness of protective clothing barrier material properties using a synthetic blood mixture. It may be used as a preliminary screen for penetration of blood and other body fluids.

The synthetic blood mixture is prepared with a red dye to aid in visual detection and with a surfactant to simulate the surface tension of blood.

This test method may not apply to all forms or conditions of biological liquid exposure. Users of the test method should review tasks for worker/clothing exposure and assess the appropriateness of this test method for their specific applications.

The values in SI units shall be regarded separately as standard. The values stated in each system must be used independently of the other, without combining values in any way.

This standard does not purport to address all of the safety problems, if any, associated with its use. It is the responsibility of the user of this standard to establish appropriate safety and health practices and determine the applicability of regulatory limitations prior to use.

Summary of Test Method

This resistance of a protective clothing material to penetration by a biological liquid (synthetic blood) is determined using a modified form of Test Method F 903. The same test apparatus and specimen exposure format are used. Exposure Procedure C from Test Method F 903 is used for the test. This procedure subjects the material to synthetic blood at 0 psi for 5 minutes followed by 2 psi (13.6 kPa) for 1 minute followed by 0 psi for 54 minutes and noting whether visible penetration occurs.

In the test apparatus, the clothing material acts as a partition separating synthetic blood from the viewing side of the test cell.

A minimum of three specimens are tested. Results are reported as "pass/fail". Any evidence of synthetic blood penetration constitutes failure.

Significance and Use

This test method is based on Test Method F 903 for measuring resistance of chemical protective clothing materials to penetration by liquids. It is normally used to evaluate specimens from finished items of protective clothing.

Finished items of protective clothing include gloves, arm shields, apron, gowns, suits, hats, boots, and the like.

The phrase "specimens from finished items" encompasses seamed and other discontinuous regions as well as the usual continuous/regions of protective clothing items.

This test method can be used to identify protective clothing materials and constructions that limit exposures to biological liquids.

Protective clothing materials are intended to be barriers to blood and other body fluids that may contain infectious agent. The use of synthetic blood may not reflect the properties of all body fluids which can contain infectious agents. Therefore, in order to simulate the wetting characteristics of blood and body liquids, the surface tension of the synthetic blood is adjusted to approximate the lower end of the surface tension range.

This test method involves a qualitative determination of the protective clothing material resistance to penetration by synthetic blood under specific test conditions. It may be suitable for use as a material quality control or assurance procedure.

Part of the protocol for exposing the protective clothing material specimens with synthetic blood involves pressurization of the test cell to 13.8 kPa (2 psig). This pressure has been documented to discriminate between protective clothing material performance and correlate with visual penetration results that are obtained with a human factors validation.

Test Specimen

Each material specimen to be tested shall have a minimum dimension of 64 mm (2.5 in.). A 70 mm (2.8 in.) square is convenient.

A more simplified test showing approximately the same barrier test result are shown in the following elbow test procedure. Results of the ASTM blood barrier test and the elbow test are correlatable in general.

ELBOW TEST

Instructions for Using the Synthetic Blood Barrier Demonstration Kit

CAUTION: Synthetic blood will permanently stain clothing and skin. Use special care during the use of this kit.

1. Remove the ink pad from plastic bag.
2. Remove top from synthetic blood bottle and liberally apply the blood to the pad by gently squeezing the bottle.
3. Remove blotter paper and material samples from their respective plastic bags.
4. Place breathable non-woven composite barrier fabric swatch over the ink pad with the material's normal outside surface against the pad.
5. Place blotter paper, shiny (coated) side up, on top of material sample.
6. Firmly apply pressure to the blotter paper with elbow.
7. Remove the blotter paper and turn bottom side up for visual examination.
8. Stains on the blotter paper indicate blood strike-through.

The non-woven composite fabric according to the invention must also provide in addition to the barrier performance, a water vapor transmission rate which is designated under ASTM E96-80, excerpts which are provided herein below.

Standard Test Method for WATER VAPOR TRANSMISSION OF MATERIALS Designation: E96-80

Scope

These methods cover the determination of water vapor transmission (WVT) of materials through which the passage of water vapor may be of importance, such as paper, plastic films, other sheet materials, fiberboards, gypsum and plaster products, wood products, and plastics. The methods are limited to specimens not over $1\frac{1}{4}$ in. (32 mm) in thickness except as provided in Section 9. The two basic methods, Upright Cup and Inverted Cup Water Method, are provided for the measurement of permeance, and two variations include service conditions with one side wetted and service conditions with low humidity on one side and high humidity on the other. Agreement should not be expected between results obtained by different methods. That method should be selected which more nearly approaches the conditions of use.

Summary of Methods

In the Upright Cup Method the test specimen is sealed to the open mouth of a test dish containing distilled water and the assembly placed in a controlled atmosphere. Periodic weighings determine the rate of water vapor movement through the specimen.

In the Inverted Cup Water Method (water resting on specimen), the dish contains distilled water, and the weighings determine the rate of vapor movement through the specimen from the water to the controlled atmosphere.

Significance and Use

The purpose of these tests is to obtain, by means of simple apparatus, reliable values of water vapor transfer through permeable and semipermeable materials, expressed in suitable units. These values are for use in design, manufacture, and marketing. A permeance value obtained under one set of test conditions may not indicate the value under a different set of conditions. For this reason, the test conditions should be selected that most closely approach the conditions of use.

Moisture vapor transmission rates for fabrics or continuous materials are determined on a basis of grams per meter square per 24 hours. The one procedure since several procedures are used in the industry, the material to be tested is fastened over the mouth of a dish which contains water. The assembly is placed in an atmosphere of constant temperature of about 90° F. and a relative humidity of 50% plus or minus 5% and the weight loss of the assembly is used to calculate the rate of the moisture vapor permeability through the test material. The moisture vapor transmission rate (MVTR) is calculated as follows:

Moisture of Vapor Transmission Rate (MVTR)=w×24 (/)t×a) Where:
w=weight loss (grams)
t=test time (hours)
a=exposed area of specimen (meters square)

The proceeding MVTR procedure was utilized and providing the performance data of Tables 1 and 2 below wherein various non-woven composite fabric materials were tested. As can be seen from Table 1 and Table 2, a variation of temperature from about 75 ° F. to about 87°-90° F. has a substantial impact on the MVTR. The rates are significantly enhanced beyond linear expectations when the temperatures are raised from 10°-20° F.

TABLE 1

MVTR Performance
Conditions: About 75° F. and about 65% relative humidity

| SAMPLE | MVTR (g/m² 24 hr) |
|---|---|
| 0.2 polypropylene web/polyethylene film/0.5 polypropylene web | 913 |
| 0.9 polypropylene web/polypropylene film/0.5 polypropylene web | 833 |
| 0.9 polypropylene web/polypropylene film/0.5 polypropylene web | 963 |

All data is for a 24 hour period and all samples shown were run together.

TABLE 2

MVTR Performance
Conditions: About 87° F. and about 46.4% relative humidity

| SAMPLE | MVTR (g/m² 24 hr) |
|---|---|
| polypropylene microporous film (no webs) | 2657 |
| 1.0 polypropylene web/polypropylene film/1.0 polypropylene web | 1965 |

All data is for a 24 hour period and all samples shown were run together.

Comparing temperature conditions of Tables 1 and 2 clearly illustrates the MVTR performance variations as a function of temperature for similar composites. As can also be seen from Table 2, a stand-alone microporous film of polypropylene at about 87° F. and 46.4% relative humidity provided an MVTR of 2657, however, such material does not have the strength to be utilized as a stand-alone material in for example medical fabric garment applications. Such films have a grab breaking strength of approximately 7.5 to about 9.0 pounds or an average of 8.2 pounds in machine direction and about an average of 10.4 in cross machine direction stretch microporous film.

The following tables, Tables 3-6 present various performance data for composite fabrics made in accordance to the present invention as well as comparative examples which are outside the scope of the present invention. In Table 3 thermal bonded breathable nonwoven composite barrier fabrics were produced utilizing spaced-apart thermal bonds. The fabric materials included one sided as well as two-sided webs in cooperation with a polypropylene microporous film. The webs varied from 0.5 to 1.25 ounces per square yard weight and were comprised of polypropylene spun-bonded webs.

The examples of Table 4 illustrate ultrasonic bonding of, for example, multiple layers of microporous polypropylene films and polypropylene webs which perform according to the invention. However, examples 7-10 provide comparative data for composites which do not fall within the invention. For example, the polyethylene microporous film examples 7-9 whether provided by thermal point bonding or special ultrasonic point bonding fail the ASTM ES21 barrier test probably because of the melt or burn-through of the polyethylene microporous film. Comparative example 10 illustrates self bonded webs of polypropylene and polypropylene microporous film which are thermally bonded and do not meet the performance criteria of the present invention. In addition, the data of Table 4 present breaking strength in pounds according to ASTM D751. These breaking strengths are generally much lower when utilizing polyethylene microporous films versus for example 6 wherein polypropylene spun-bonded webs are combined with two microporous polypropylene films.

TABLE 3

| | EXAMPLE NO. | | | | |
|---|---|---|---|---|---|
| | 1 | 2 | 3 | 4 | 5 |
| Thermal Bonds | 0.5 PP/MPP/0.5 PP Ultrasonic | 0.9 PP/MPP/0.5 PP Ultrasonic | 1.0 PP/MPP/1.0 PP Ultrasonic | 1.25 PP/MPP/1.25 PP Ultrasonic | ONE SIDE 0.9 PP/MPP Ultrasonic |
| ASTM ES 21 | Pass | Pass | Pass | Pass | Pass |
| MVTR g/m²/24 hr** (ASTM E 96) | 706 | 720 | NA | 683 | 660 |
| BREAKING STRENGTH lbs: (ASTM D751) (Grab Method) | | | | | |
| MD | 27.8 | 37.0 | NA | 63.2 | 25.86 |
| XM | 21.2 | 26.5 | NA | 56.6 | 16.52 |

(See footnotes following Table 5 for abbreviation definitions.)

TABLE 4

| | EXAMPLE NO. | | | | |
|---|---|---|---|---|---|
| | 6 | 7 (Comparative) | 8 (Comparative) | 9 (Comparative) | 10 (Comparative) |
| Thermal Bonds | 0.5 PP/MPP/ 0.5 PP/MPP/0.5 PP | 0.9 PP/MPE/ 0.5 PP | 1.0 PP/ MPE/0.5 PP | ONE SIDE SBPE/ MPE Thermal | Self Bonded Webs 0.2 PP/MPP/0.5 PP |

TABLE 4-continued

| | EXAMPLE NO. | | | | |
|---|---|---|---|---|---|
| | 6 | 7 (Comparative) | 8 (Comparative) | 9 (Comparative) | 10 (Comparative) |
| ASTM ES 21 | Ultrasonic Pass | Ultrasonic Fail | Ultrasonic Fail | (Point Bonded) Fail | Thermal (Point Bonded) Fail 6 to 9 |
| MVTR g/m$^2$/24 hr** (ASTM E 96) | 599 | 667 | 602 | 457 | 768 |
| BREAKING STRENGTH lbs: (ASTM D751) (Grab Method) | | | | | |
| MD | 69.64 | 28.58 | NA | 19.88 | 25.24 |
| XM | 54.94 | 22.10 | NA | 19.08 | 19.30 |

(See footnotes following Table 5 for abbreviation definitions.)

TABLE 5

| | EXAMPLE NO. | | |
|---|---|---|---|
| | 11 (Comparative) | 12 (Comparative) | 13 (Comparative) |
| Adhesive Bonds | 0.9 PP/MPE/1.0 PP | 1.5 PP/MPE | .9 PP/MPP/1.0 PP |
| ASTM ES 21 | Pass | Pass | Pass |
| MVTR g/m$^2$/24 hr** | 554 | 486 | 642 |
| BREAKING STRENGTH lbs: (ASTM D751) | | | |
| MD | 50.02 | 41.42 | NA |
| XM | 48.74 | 36.36 | NA |

*MD — Machine Orientation of the composite
XM — Cross Machine Orientation of the composite
*MPP — Microporous Polypropylene
*MPE — Microporous Polyethylene
*SBPE — Spunbonded Polyethylene
*PP — Non-woven Polypropylene
*Note that all numbers in the composite, (.9 PP/MPP/.5 PP), are the basis weights of the nonwoven in ounces per square yard. Also, the nonwoven is polypropylene unless it is otherwise noted.
**Ambient Room Condition of 75° F. ± 2° F. and 65% Relative Humidity ± 2% Relative Humidity (Upright Cup).

TABLE 6

| | EXAMPLE NO. | | |
|---|---|---|---|
| | 14 (Fabric according to invention) | 15 (Comparative commercial composites) SBPP/Meltblown PP/SBPP* | 16 (Comparative commercial composites) Spunlaced Woodpulp/Polyester |
| Resistance to synthetic blood penetration ASTM ES21 (pass/fail) | Pass | Fail | Fail |
| Hydrostatic Pressure Test Resistance to liquid penetration expressed in liquid column inches | 43+ | 20.7 | 9.6 |
| Bacterial Filtration Efficiency MIL Spec. | 99.9% | 81.3% | 63.3% |
| Moisture Vapor Transmisson Rate Comfort test, expressed in grams per square meter per 24 hours. ASTM E96 | 1385 | 1794 | N/A |
| Standard classification for the flammability of wearing apparel NFPA Method 702 | Class I (Relatively slow burning) | Class I (Relatively slow burning) | Class 3 (Relatively flammable) |

*SBPP — Spun-Bonded Polypropylene

In Table 5, examples 11 and 12 present microporous polyethylene films and adhesive bonded webs of polypropylene which pass the barrier test under ASTM ES21 and have satisfactory MVTR ratings. Example 13 utilizing polypropylene microporous film and polypropylene spun-bonded webs also pass the barrier and MVTR performance criteria and would fall within the scope of the present invention but for the fact that the materials are adhesive bonded rather than thermally bonded. Thermally bonded materials especially point bonded material are preferable in many applications due to the avoidance of adhesive contaminants as well as ease of manufacture.

In Table 6, example 14 is made in accordance to the present invention wherein ultrasonic point bonding produced polypropylene webs sandwiching a polypropylene microporous film is presented. Examples 15 and 16 are comparative, commercial composites presently available on the market which fail the barrier test and as one would expect, have lower ratings on the bacteria filtration efficiency standard test based on MIL Spec. 36954C.

Comparative evaluations of the products according to the present invention, i.e. the blue material versus the comparative white material are evaluated as follows in a protein blocking test procedure.

PROTEIN BLOCKING TEST Comparative Evaluation

Two materials, 0.9 PP/MPP Film/0.5 PP (Blue) and 0.9 PP/MPE Film/0.5 PP (White—comparative) were evaluated using the protocol as outlined below:

The edges of all test samples were sealed with paraffin to prevent leakage around the sides of the material. Test samples were then sealed in ASTM F739 cells which had been modified to couple a vacuum source to the normal collection inlet ports. A vacuum gauge was placed in line to continuously monitor differential pressure. 20.0 mL of a solution containing 0.5% gamma globulin (150,000 molecular weight fraction, Sigma Chemical Co.) in phosphate buffered saline (PBS) was added to the challenge side of each cell. For the 0.9 PP/MPE Film/0.5 PP (White) fabric, 380 mm Hg was applied to the collection side of each cell for 15 seconds. Approximately ⅓ of the original volume passed through the fabric within this interval. For the 0.9 PP/MPP Film/0.5 PP (Blue) material, 380 mm Hg was applied to the collection side of each cell for 60 minutes, with no visible flow of the protein solution through the fabric. The vacuum was then increased to 609 mm Hg for an additional 15 minutes, again with no visible flow of the protein solution through the fabric. The concentrations of protein in the initial solution and in the filtrate from each test cell, were determined via BCA protein assay (kit available from Pierce). The BCA assay allows spectrophotometric determination of protein concentration by combining the Blueret reaction (protein reducing $CU^2$ in an alkaline medium to produce $Cu^1$) with bicinchoninic acid (BCA), which is highly sensitive and specific for the cuprous ion. The assay was performed according to the manufacturer's instructions, using the "enhanced protocol" in order to shorten incubation times. A standard curve was constructed using dilutions of BSA (bovine serum albumin) ranging from 5–30 ug. The test samples were diluted 1:20 with PBS so that the expected concentrations would fall in the same range as the standard curve. Blanks were included for each fabric which consisted of using PBS (with no protein added) as the challenge solution, and following the procedure described above. Tests on each fabric were performed in triplicate. For the 0.9 PP/MPP Film/0.5 PP (Blue) fabric, since no filtration was achieved, an estimate of greater than 99% blocking can be assumed. For the 0.9 PP/MPE Film/0.5 PP (White) material, the percent protein blocking for the three replicates was as follows:

| Cell 1 | Cell 2 | Cell 3 | Cell 4 |
|---|---|---|---|
| 4.6% | 7.4% | 8.4% | 6.8% |

The protein blocking test again illustrates a barrier phenomena wherein the breathable non-woven composite barrier fabric in accordance with the invention achieved 99% blockage of the protein while a product produced with a polyethylene microporous film substantially fails the barrier test. Water permeability flow rates are presented showing a comparative composite utilizing a polyethylene microporous film versus the composite in accordance with the invention utilizing a polypropylene microporous film wherein both films and composites have been thermally bonded. It is quite clear from the flow test data that the polyethylene microporous film acts as a filter rather than a barrier and allows substantial flow of water.

| WATER PERMEABILITY (flow rate) | | |
|---|---|---|
| | liter/sq. M.hr @ 258 mmHg | liter/sq M.hr.atm |
| FLOW TEST WITH SCRIM BACKING: | | |
| Composite based on PE microporous film (comparative) | 171 | 502 |
| Composite based on PP microporous film | 19* | 57* |
| FLOW TEST WITHOUT SCRIM: | | |
| Composite based on PE microporous film (comparative) | 29,197 | 85,874 |
| Composite based on PP microporous film | 49* | 143* |

Test Conditions: 258 mmHg (5 psi) on a 2.26 inch diameter ASTM F903 penetration cell with and without a scrim backing to prevent expansion deformation of the composite fabric.
Samples were preconditioned by soaking in a 50/50 mix of methanol and distilled water followed by a rinse in distilled water.
Polyethylene sample: Composite of polyethylene microporous film ultrasonically bonded between layers of .9 oz/sy and .5 oz/sy spun-bonded polypropylene non-wovens.
Polypropylene sample: Composite of polypropylene microporous film ultrasonically bonded between layers of .9 oz/sy and .5 oz/sy spun-bonded polypropylene non-wovens.
Liter/sq M.hr.atm measurement assumes a linear relationship between flow rate and pressure.
No water droplets were observed with the polypropylene composite with or without scrim backing and most of the measured flow was attributed to cell leakage. Droplets were obvious on the polyethylene composite and water flowed in a shower head like effect when the test was conducted without the backing.
*Assumed apparatus leakage as substantial reason for water permeability.

The preceding examples and comparative examples and test procedure discussions are not to be understood as limiting to the scope of the present invention, the scope of the present invention being limited only as indicated by the pending claims.

What is claimed is:

1. A non-woven composite fabric comprising:
   a polypropylene microporous thermoplastic film having at least one film surface thermally bonded by ultrasonic point bonding to a layer of non-woven thermoplastic materials, said film and layers being thermally bonded at multiple spaced-apart locations;
   said composite fabric providing a barrier to passage of biological liquid when the composite fabric is subjected to contact with synthetic blood at zero psi for 5 minutes followed by synthetic blood contact at 2 psi (13.6 kpa) for one minute followed by synthetic blood contact at zero psi for fifty-four minutes, said composite fabric exhibiting no visible penetration of synthetic blood; and
   said non-woven composite fabric having a moisture or vapor transmission rate of greater than about 450 grams per square meter for twenty-four hours at about 75 degrees F. and about 65% relative humidity.

2. A non-woven composite fabric according to claim 1, wherein the thermoplastic microporous film has a thermoplastic non-woven layer of the same or different materials thermally bonded to a first surface of the microporous film and a second surface of the microporous film.

3. A non-woven composite fabric according to claim 2, wherein the thermoplastic microporous film and thermoplastic non-woven materials of the layers are comprised of thermoplastic polymers.

4. A non-woven composite fabric according to claim 3, wherein said thermoplastic polymers are comprised of polyolefins or copolymers of polyolefins.

5. A non-woven composite fabric according to claim 1, wherein the multiple layered microporous film provides a bacterial filtration efficiency test under MIL Spec. 36954C of 99% or greater.

6. A non-woven composite fabric according to claim 4, wherein the thermoplastic microporous film and the non-woven layers are comprised of polypropylene.

7. A non-woven composite fabric according to claim 1, wherein the thermoplastic microporous film has a water hold-out greater than 45 pounds per square inch as measured by the Mullen burst test.

8. A non-woven composite fabric according to claim 1, wherein said thermoplastic non-woven layers, which are spun-bonded, have a grab strength in machine direction of at least 6.5 pounds to break, cross-directional of at least 5 pounds to break and an elongation value of at least 52% machine direction and at least 72% cross-direction.

9. A non-woven composite fabric according to claim 2, wherein a first and second layer of thermoplastic non-woven materials have individual layer weights of at least 0.2 ounces per square yard to about 2.5 ounces per square yard.

10. A non-woven composite fabric according to claim 8, wherein the first and second non-woven layer of spun-bonded thermoplastic are of different thicknesses.

11. A non-woven composite fabric according to claim 10, wherein the thermoplastic non-woven layer exposed to use environment is thicker than the layer exposed to a user.

12. A non-woven composite fabric according to claim 1, having at least two microporous films having individual layers of non-woven materials thermally bonded to a first and second surface of a first microporous film and a first and second surface of a second microporous film, the layers and microporous films being thermally bonded together to form the non-woven composite fabric.

13. A non-woven composite fabric according to claim 1, which exhibits a hydrostatic head of at least about 25+ pressure resistance to liquid penetration expressed in liquid column inches.

14. A non-woven composite fabric according to claim 2, wherein moisture or vapor transmission is unaffected or enhanced when the non-woven layer on a first surface of the microporous film includes anti-static components and the non-woven composite fabric continues to provide a barrier to passage of biological liquids which are contacted to a non-woven layer on a second microporous film surface.

15. A non-woven composite fabric according to claim 12, wherein the first and second microporous films share a single non-woven layer thermally bonded between the first microporous second surface and the second microporous first surface.

16. A non-woven composite fabric comprising:
a polypropylene microporous film having at least one film surface bonded to a layer of non-woven thermoplastic polymer, said film and layers being bonded at multiple spaced-apart locations;
said layers and microporous film being joined by ultrasonic point bonding;
said composite fabric providing a barrier to passage of biological liquid as defined when the composite fabric is subjected to contact with synthetic blood at zero psi for five minutes followed by synthetic blood contact at 2 psi for one minute followed by zero psi synthetic blood contact for fifty-four minutes, said composite fabric exhibiting no visible penetration of the synthetic blood; said composite fabric having a moisture or vapor transmission rate of greater than about 450 grams per square meter for twenty-four hours at about 75° F. and about 65% relative humidity; and
said woven composite fabric having a breaking strength of at least about 14 pounds.

17. A non-woven composite fabric according to claim 16, wherein the first and second layer of thermoplastic non-woven materials bonded to a first and a second surface of the polypropylene microporous film are comprised of polypropylene and the layers have the same or different thicknesses.

18. A non-woven composite fabric according to claim 16, having at least two microporous films having individual layers of non-woven polypropylene bonded to a first and second surface of a first microporous film and a first and second surface of a second microporous film, the layers and microporous films being thermally bonded to form the nonwoven composite fabric.

19. A non-woven composite fabric according to claim 18, wherein the first and second microporous films share a single non-woven layer between the first microporous second surface and the second microporous first surface.

20. A non-woven composite fabric according to claim 18, wherein the individual non-woven layers of polypropylene bonded to surfaces of at least two microporous films provide a bacterial filtration efficiency test MIL Spec. 36954C of 99% or greater.

21. A non-woven composite fabric according to claim 16, wherein anti-static components are included in all non-woven layers.

22. A non-woven composite fabric according to claim 16, wherein the polypropylene layers are spun-bonded.

23. A non-woven composite fabric according to claim 16, wherein the first and second non-woven polypropylene layers have a basis weight of about 0.5 ounces per square yard.

24. A non-woven composite fabric according to claim 16, wherein the first nonwoven polypropylene layer has a basis weight of about 0.5 ounces per square yard and the second non-woven polypropylene layer has a basis weight of about 0.9 ounces per square yard.

25. A non-woven composite fabric according to claim 16, wherein the composite fabric has been sterilized.

26. A process for forming a thermally bonded non-woven composite fabric having a moisture or vapor transmission rate of greater than about 450 grams per square meter for 24 hours at about 75° F. and about 65% relative humidity, said fabric providing a barrier to passage of biological liquid when the composite fabric is subjected to contact with synthetic blood at 0 psi for 5 minutes followed by synthetic blood contact at 2 psi (13.6 kpa) for 1 minutes followed by synthetic blood contact at 0 psi for 54 minutes, said composite fabric exhibiting no visible penetration of the synthetic blood; and said composite fabric having a breaking strength of at least 14 pounds per inch;
comprising:
unwinding and contacting at least one continuous thermoplastic non-woven web to at least one side of a continuous polypropylene microporous film;

continuously transporting said contacted web and film through an ultrasonic point bonding zone; thermally bonding the webs and film at multiple spaced-apart locations; said bonding having a dwell time sufficient to thermally bond while avoiding burn-through degradation of the film and webs; and forming the thermally bonded non-woven composite fabric.

27. The process according to claim 26 wherein a continuous thermoplastic non-woven web is contacted to both surfaces of the continuous thermoplastic microporous film.

28. The process according to claim 26 wherein contact ultrasonic point bonding is achieved at a dwell of from about 13 about 32 yards per minute using bonding pins mounted on a pattern roller, said pins having a diameter of about 0.5 mm and the pattern roller being cooled by air; said pins contacting and partially compressing the continuous contacted web and film in alignment with and on an opposite side of the continuous web and film from an ultrasonic source surface.

29. The process according to claim 28 wherein the ultrasonic source surface is adjustable in dimensional relationship to the constant position of the pattern roller and mounted bonding pins; the ultrasonic source surface being comprised of ultrasonic horn segments which can be independently adjusted in relationship to the bonding pins facing depending on the variation of web and film thickness across the entire width of the said contacted web and film.

30. The process according to claim 26 wherein the thermoplastic non-woven material is spun-bonded and is comprised of polyolefins or co-polymers of polyolefins.

31. The process according to claim 30 wherein the non-woven thermoplastic webs vary in basis weight of from about 0.2 ounces per square yard to about 2.5 ounces per square yard.

32. The process according to claim 28 wherein the dwell time in the ultrasonic thermal-bonding zone is from about 1.0 to about 1.5 milli-seconds.

33. The process according to claim 28 wherein reduced dwell time is achieved by utilizing bonding pins of about the same width as the 0.5 mm diameter pin but having an extended length of up to 1.0 to 1.5 mm.

34. The process according to claim 26 wherein the thermoplastic microporous film is comprised of polypropylene.

35. The process according to claim 28 wherein the thermoplastic non-woven webs are comprised of polyolefins or co-polymers of polyolefins.

36. The process according to claim 26 wherein at least one continuous thermoplastic non-woven web is comprised of polypropylene and the continuous thermoplastic microporous film is comprised of polypropylene with the webs and microporous film being melt-bonded at spaced-apart contact points.

37. The process according to claim 26 wherein the thermally bonded polypropylene non-woven composite fabric is sterilized by treating the composite with ethylene oxide.

* * * * *